May 26, 1931.                I. SUNDSTROM                1,807,560
                           EYEGLASS MOUNTING
                         Filed April 25, 1929
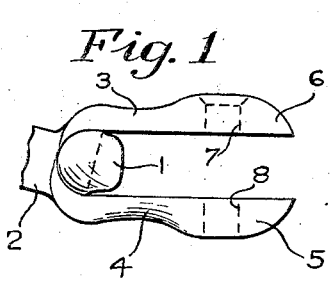
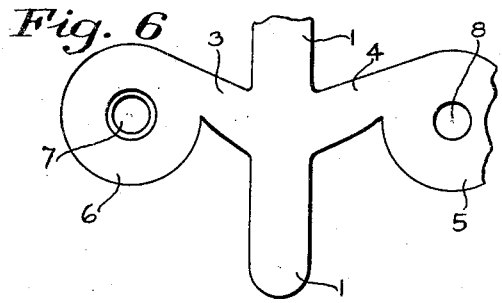
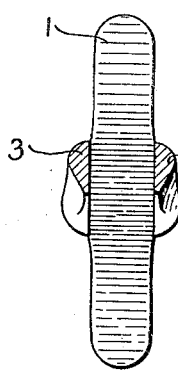
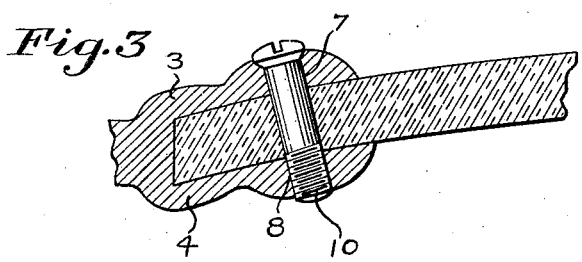
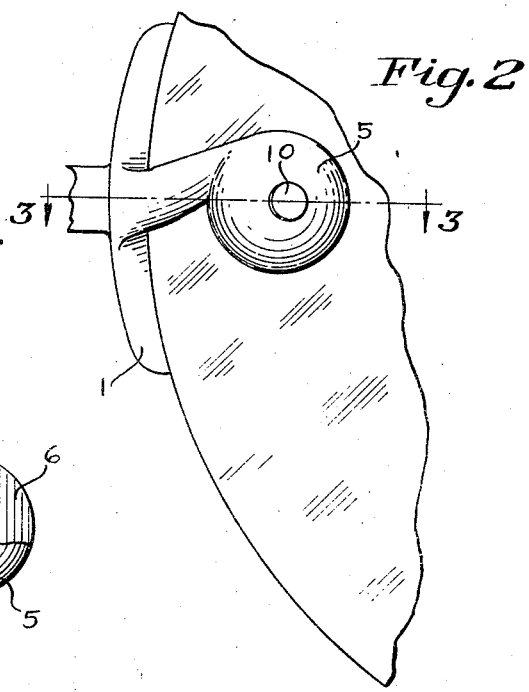
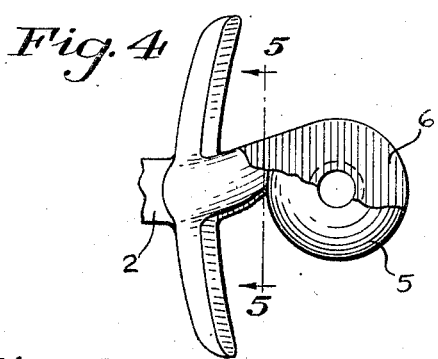
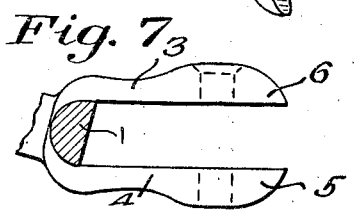
INVENTOR
Ivar Sundstrom
BY Harold E. Stonebraker,
his ATTORNEY Patented May 26, 1931

1,807,560

UNITED STATES PATENT OFFICE

IVAR SUNDSTROM, OF ROCHESTER, NEW YORK, ASSIGNOR TO SHURON OPTICAL COMPANY, INC., A CORPORATION OF NEW YORK

EYEGLASS MOUNTING

Application filed April 25, 1929. Serial No. 358,010.

This invention relates to improvements in eyeglass mountings, and especially to lens mounts by means of which lenses are secured to the nose piece and temples.

In mounting eyeglasses, difficulty has been experienced in securing the lens mounts to the lenses, especially thin toric, concavo-convex or plano-convex lenses, and particularly when the radii of curvature of the lens surfaces are comparatively short. These mounts are provided with clips which extend over the faces of the lens and are secured to the lens by means of screws or bolts which extend through the clips and openings provided therefor in the lens.

The screw openings in the lenses are preferably radial or substantially perpendicular to a tangent to the lens surface at the point where the opening is made, whereas it is desirable to cut the peripheral surface or edge of the lens in a plane parallel with a perpendicular to a tangent at the center of the lens, or parallel with the axis of the lens. As a result, the edge of the lens is not parallel with the screw opening therein, and the openings in the clip or mount as heretofore constructed do not register with the opening in the lens, making it difficult to insert the screw and often resulting in breaking the lens.

The object of this invention is to provide a lens mount in which the strap conforms exactly to the edge or periphery as well as the opposite faces of the lens and the screw opening in the latter registers with the screw openings in the strap.

A further object of the invention is to provide a lens mount having a lens-periphery engaging portion and a pair of ears adapted to engage the faces of the lens, said ears being formed on arms of unequal lengths on the lens-periphery engaging portion relatively to which they are inclined so that screw openings in the ears register with opposite ends of a screw opening in the lens when the periphery of the latter rests tightly against the seat in said lens-periphery engaging portion.

Another object of the invention is to provide a lens mount with a lens-periphery engaging portion, a pair of ears arranged on opposite faces of the lens and having screw openings adapted to register with the opposite ends of a screw opening in the lens, and arms connecting the ears with the lens-periphery engaging portion, said arms being cut away or reduced in cross-section and the ears offset thereon so that the arms will bend or yield relatively to the periphery engaging portion both laterally and longitudinally to permit the openings in the ears to register with the opposite ends of the opening in the lens without breaking or crowding the lens.

The mounting comprising the invention is made by forming it from a blank having a base or lens-periphery engaging portion, a pair of ears having screw openings therein and connected with the base portion by means of laterally yieldable arms which are of unequal lengths so that the axes of the screw openings are at unequal distances from the middle of the base portion, and bending the arms until they extend in the same direction from the base portion with their inner faces substantially parallel and inclined relatively to the inner surface of the base portion, while the axes of the screw openings are in the same straight line.

To these and other ends, the invention consists in the construction and arrangement of parts that will appear clearly from the following description when read in conjunction with the accompanying drawings, the novel features being pointed out in the claim following the specification.

In the drawings:

Figure 1 is a plan view of a lens mount constructed according to one embodiment of the invention;

Figure 2 is a front elevation of the same, showing a toric lens attached thereto;

Figure 3 is a section on the line 3—3 of Figure 2;

Figure 4 is a front elevation, parts being broken away for clearness;

Figure 5 is a section on line 5—5 of Figure 4 looking in the direction of the arrow at said line;

Figure 6 is an elevation of a blank from which the lens mount is formed, and

Figure 7 is a plan, partly in section, of a lens mount as formed from the blank.

Similar reference numerals refer to the same parts in all the figures of the drawings. The embodiment of the invention illustrated herein comprises a lens mount or strap having a base or lens-periphery engaging portion 1 adapted to engage the edge or circumferential wall of a lens, and having an outwardly extending integral portion or shank 2 connected to the nose piece or temple.

Formed integral with the base portion 1 are flanges or arms 3 and 4 extending inwardly therefrom on opposite sides or faces of the lens which are provided at their inner ends with enlarged offset ear portions 5 and 6 provided with central screw openings 7 and 8, one of which may be internally threaded for cooperation with the threads of a screw 10. The arms 3 and 4 on which the ears 5 and 6 are carried are cut away to make them comparatively thin and narrow so that they may readily yield or bend to permit the ears to yield relatively to the base portion both laterally and longitudinally to compensate for any slight eccentricity between the screw openings in the lens and the mount, and thereby prevent breakage of the lens.

By referring to Figures 1 and 3, it will be noted that the arm 4 is slightly longer than the arm 3, and by reference to Figure 3, in which a concavo-convex, curved or toric lens is shown, it will be noted that the distance from the edge or periphery of the lens to the screw opening therein is greater along the inner concave surface of the lens than along the outer convex surface. The longer arm is therefore made to cooperate with the inner surface of the lens and the shorter arm with the outer surface of the lens, thus permitting the openings therein to register accurately with the opposite ends of the screw opening in the lens, while at the same time the ends of the arms are equally distanced from the hole in the lens and present a symmetrical and pleasing appearance.

It will also be noted that the arms are not perpendicular to the base or lens-periphery engaging portion of the mount, but are inclined relatively thereto, the inner arm forming an acute angle therewith and the outer arm an obtuse angle. By this arrangement, the base portion hugs the entire width of the periphery of the lens, preventing any looseness between the mount and the lens which often results in breaking the lens.

In Figure 6 of the drawings is illustrated a blank from which a mount such as above described may be formed. It comprises a base or lens-periphery engaging portion 1 at its center. The arms 3 and 4 extend laterally and have the ears 5 and 6 formed on their outer ends provided with openings 7 and 8. The ears are offset relatively to the arms and one of the arms 4 is longer than the other. By making the arms of different lengths, the axis of the screw opening 7 in the ear 6 is nearer to the central line of the base than the axis of the screw opening 8 in the ear 5.

It will also be noted that the arms 3 and 4 are reduced in cross-section or cut away between the ears and the base portion. In forming a lens mount from the blank, the arms are bent up on the base portion to a position in which their inner faces are substantially parallel with each other and the axes of the screw openings in the ears lie in substantially the same straight line. By reference to Figure 7, it will be noted that the arm 4 is bent through an angle greater than a right angle so that its inner face forms an acute angle with the base portion, and that the arm 5 is bent through an angle less than a right angle so that its inner face forms an obtuse angle with the base portion, the distance between the arms being substantially the thickness of the lens.

A lens mount formed of a blank as above described is adapted to engage or fit closely the periphery of a lens engaging the wall of the periphery closely throughout its width, and to engage the faces of the lens firmly without any bending or adjustment of the arms. The screw openings in the ears register with the opposite ends of the screw opening in the lens so that the axis of the screw coincides accurately with the axes of the screw openings. This prevents the shank of the screw from engaging the edges of the lens opening and thereby causing the lens to break.

While the invention has been described with reference to a particular embodiment thereof, it is not confined thereto but is intended to cover such modifications thereof as may come within the intent or scope of the appended claim.

I claim:

A mount for a curved lens having a screw opening, one end of which is at a greater distance from the edge of the lens than the other, said mount having a shank, an elongated base portion arranged to engage the periphery of the lens and extending in opposite directions from said shank, arms of unequal lengths corresponding to the distances of the ends of the screw opening in the lens from its edge extending directly inwardly from said base portion in contact with the faces of the lens, said arms having their lens-engaging faces substantially parallel to each other and inclined with reference to the inner surface of said base portion, and ears on the inner ends of said arms having openings therein arranged to aline with the opposite ends of said screw opening in the lens.

In witness whereof, I have hereunto signed my name.

IVAR SUNDSTROM.